(12) United States Patent
D'Souza et al.

(10) Patent No.: US 8,621,377 B2
(45) Date of Patent: Dec. 31, 2013

(54) CONFIGURABLE HVAC CONTROLLER TERMINAL LABELING

(75) Inventors: Aaron Francis D'Souza, Bangalore (IN); Stalin Gutha Sanghamitra, Bangalore (IN); Ralph Collins Brindle, Edina, MN (US); Levi Geadelmann, Edina, MN (US); Kevin Moore, Chaska, MN (US)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 13/071,092

(22) Filed: Mar. 24, 2011

(65) Prior Publication Data

US 2012/0246590 A1  Sep. 27, 2012

(51) Int. Cl.
*G06F 3/048* (2013.01)

(52) U.S. Cl.
USPC ....... 715/771; 715/740; 715/810; 379/102.05

(58) Field of Classification Search
USPC ......... 715/700, 740, 764, 771, 781, 810, 864, 715/273; 379/90.01, 93.17, 93.19, 93.25, 379/102.01, 102.05; 345/169
See application file for complete search history.

(56) References Cited

U.S. PATENT DOCUMENTS

| | | |
|---|---|---|
| 4,072,380 A | 2/1978 | Freehauf |
| 4,401,353 A | 8/1983 | McDevitt, Jr. et al. |
| 4,426,850 A | 1/1984 | Reedy |
| 4,540,226 A | 9/1985 | Thompson et al. |
| 4,609,241 A | 9/1986 | Peterson |
| 4,788,520 A | 11/1988 | Strand |
| 5,039,009 A | 8/1991 | Baldwin et al. |
| 5,299,113 A | 3/1994 | England et al. |
| 5,373,470 A | 12/1994 | Jones, Jr. |
| 5,376,930 A | 12/1994 | Merkle et al. |
| 5,473,229 A * | 12/1995 | Archer et al. ............ 318/400.18 |
| 5,530,643 A | 6/1996 | Hodorowski |
| 5,572,409 A | 11/1996 | Nathan et al. |
| 5,673,418 A | 9/1997 | Stonier et al. |
| 5,721,737 A | 2/1998 | Radjabi et al. |
| 5,726,482 A | 3/1998 | Nathan et al. |
| 5,727,170 A | 3/1998 | Mitchell et al. |

(Continued)

FOREIGN PATENT DOCUMENTS

JP 5053617 A 3/1993

OTHER PUBLICATIONS http://www.precicontact.ch/uso%20so%20socket.htm, Precicontact, Dip Socket, 4 pages, printed Mar. 5, 2003.

(Continued)

*Primary Examiner* — Xiomar L Bautista
(74) *Attorney, Agent, or Firm* — Seager Tufte & Wickhem LLC.

(57) ABSTRACT

A configuration tool for a programmable HVAC controller is provided. The configuration tool may accept user input, and may generate a corresponding configuration profile based on the user input. The configuration profile may be downloaded to a programmable HVAC controller, which may, among other things, reconfigure the I/O terminals of the programmable HVAC controller. The configuration tool may generate a terminal diagram that labels at least some of the I/O terminals of the programmable HVAC controller based on the particular configuration profile. In some cases, the configuration tool may output the terminal diagram in a format that can be printed on a label, with the label being suitable for adhering to the programmable HVAC controller.

20 Claims, 5 Drawing Sheets

(56) References Cited

U.S. PATENT DOCUMENTS

| | | |
|---|---|---|
| 5,754,823 A | 5/1998 | Mudryk, Jr. et al. |
| 5,764,507 A | 6/1998 | Chuo |
| 5,806,760 A | 9/1998 | Maiello |
| 5,917,229 A | 6/1999 | Nathan et al. |
| 5,920,731 A | 7/1999 | Pletl et al. |
| 5,950,709 A | 9/1999 | Krueger et al. |
| 5,958,026 A | 9/1999 | Goetting et al. |
| 6,000,458 A | 12/1999 | Watanabe |
| 6,029,092 A | 2/2000 | Stein |
| 6,169,937 B1 | 1/2001 | Peterson |
| 6,289,409 B1 | 9/2001 | Bacigalupo |
| 6,308,231 B1 | 10/2001 | Galecki et al. |
| 6,363,137 B1 | 3/2002 | Nakao et al. |
| 6,401,139 B1 | 6/2002 | Hamilton et al. |
| 6,445,242 B2 | 9/2002 | Bloodworth et al. |
| 6,505,245 B1 | 1/2003 | North et al. |
| 6,564,561 B2 | 5/2003 | Daum et al. |
| 6,618,628 B1 | 9/2003 | Davlin et al. |
| 6,725,281 B1 | 4/2004 | Zintel et al. |
| 6,728,258 B1 | 4/2004 | Okada et al. |
| 6,825,689 B1 | 11/2004 | Snyder |
| 6,832,185 B1 | 12/2004 | Musselman et al. |
| 6,870,397 B1 | 3/2005 | Fox et al. |
| 6,888,441 B2 | 5/2005 | Carey |
| 7,034,570 B2 | 4/2006 | McClintock et al. |
| 7,044,397 B2 | 5/2006 | Bartlett et al. |
| 7,055,759 B2 | 6/2006 | Wacker et al. |
| 7,068,164 B1 | 6/2006 | Duncan et al. |
| 7,085,814 B1 | 8/2006 | Gandhi et al. |
| 7,208,975 B1 | 4/2007 | Agrawal et al. |
| 7,287,189 B1 | 10/2007 | Johnson et al. |
| 7,330,919 B2 | 2/2008 | Zhang et al. |
| 7,499,810 B1 | 3/2009 | Walker |
| 7,722,800 B2 | 5/2010 | Williams et al. |
| 7,844,764 B2 | 11/2010 | Williams |
| 2004/0238651 A1 | 12/2004 | Juntunen et al. |
| 2005/0190303 A1* | 9/2005 | Kim et al. .................. 348/706 |
| 2005/0192790 A1 | 9/2005 | Endo et al. |
| 2006/0004492 A1 | 1/2006 | Terlson et al. |
| 2006/0277027 A1 | 12/2006 | Mann et al. |
| 2008/0004725 A1* | 1/2008 | Wacker ....................... 700/83 |
| 2008/0046227 A1 | 2/2008 | Flamingo |
| 2009/0082047 A1 | 3/2009 | Phillips et al. |
| 2009/0113037 A1* | 4/2009 | Pouchak .................... 709/224 |

OTHER PUBLICATIONS

Honeywell, 7800 Series, "The Burner Control Family for Your Boiler, Your Baker, Your Hot Water Maker," 2 pages, Dec. 1995.

Honeywell, 7800 Series EC7810A, EC7820A Relay Modules, Specification Data, 8 pages, Mar. 1998.

Honeywell, 7800 Series Q7800 A,B 22-Terminal Universal Wiring Subbase, Product Data, 8 pages, Nov. 1998.

Honeywell, 7800 Series S7830 Expanded Annunciator, 12 pages, Jun. 1992.

Novar, "Unitary Control Module (UCM)," 2 pages, Jan. 15, 2007.

Novar, "Unitary Control Module (UCM), Executive Summary" 2 pages, Jan. 15, 2007.

Novar, "Unitary Control Module (UCM), Installation Instructions," pp. 1-10, Dec. 11, 2006.

So et al., "Building Automation on the Information Superhighway," Ashrae Transactions, Technical and Symposium Papers Presented at the 1998 Annual Meeting in Toronto, Ontario of the American Society of Heating, Refrigerating and Air-Conditioning Engineers, Inc, vol. 104 Part 2, pp. 176-191, 1998.

* cited by examiner

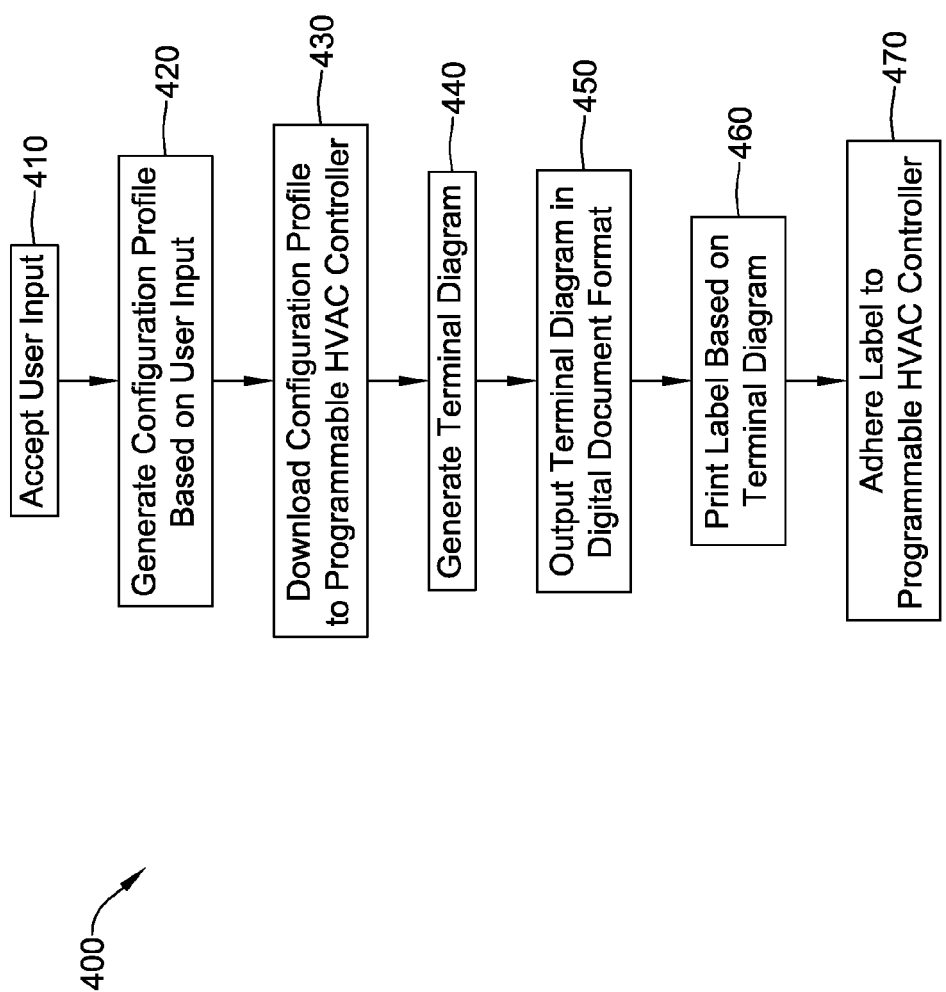

CONFIGURABLE HVAC CONTROLLER TERMINAL LABELING

TECHNICAL FIELD

The disclosure relates generally to HVAC controllers, and more particularly, to HVAC controllers having configurable input/output terminals.

BACKGROUND

HVAC controllers, or control modules, are frequently used in controlling various components of a climate control system of a building or other structure. Such HVAC controllers are often employed to provide control over a furnace, an air-conditioner, a heat pump, a ventilation system, a damper valve, and/or other system component(s), depending on the application. In some cases, HVAC controller may be used in conjunction with one or more other HVAC controllers as part of a networked, hierarchical and/or other HVAC system.

In some cases, the HVAC controllers must have a specific hardware and/or software configuration that is adapted to control a particular component or set of components within an HVAC system. Due to the large number of variations in systems and system components used in the field, the manufacturer of such HVAC controllers must often produce and stock numerous controller configurations, resulting in increased cost and overhead. There is a need for improved tools and methods for use in configuring and installing such HVAC controllers.

SUMMARY

The disclosure relates generally to HVAC controllers, and more particularly, to HVAC controllers having configurable input/output terminals. In one illustrative embodiment, a configuration tool for configuring a programmable HVAC controller having a plurality of assignable I/O terminals is provided. The configuration tool may include a user interface and a controller in communication with the user interface. The controller may be programmed to accept user input from a user via the user interface, and based on the accepted input from the user, generate a corresponding configuration profile. The configuration profile, once loaded into the programmable HVAC controller, may cause the programmable HVAC controller to assume a particular controller configuration, with each of at least some of the plurality of assignable I/O terminals of the programmable HVAC controller assigned to a particular I/O function. The configuration tool may include an interface in communication with the controller such that once the configuration tool is connected to the programmable HVAC controller, the controller may download the configuration profile to the programmable HVAC controller via the interface. The controller may further be programmed to generate a terminal diagram that labels at least some of the plurality of assignable I/O terminals of the programmable HVAC controller with the assigned particular I/O functions that are defined by the particular configuration profile generated by the controller based on the accepted input from the user. In some cases, the controller is programmed to output the terminal diagram in a format that can be printed on a label, with the label suitable for adhering to the programmable HVAC controller such that at least some of the plurality of assignable I/O terminals of the programmable HVAC controller have an adjacent label marking that labels the corresponding assignable I/O terminal with the assigned particular I/O function. In some instances, the configuration tool may include a desktop and/or notebook computer, and/or a portable handheld device such as a cell phone or personal digital assistant, as desired. In some cases, the controller may be programmed to output the terminal diagram in a digital document format such as Adobe™ PDF or Microsoft Word™ formats, which can then be printed on predefined labels that are sized to match the particular programmable HVAC controller model.

In another illustrative embodiment, the present disclosure provides a method for configuring a programmable HVAC controller having a plurality of I/O terminals. The method may include accepting user input from a user via a user interface, and based on the accepted input from the user, generating a corresponding configuration profile. The configuration profile, if loaded into the programmable HVAC controller, may cause the programmable HVAC controller to assume a particular controller configuration, with each of at least some of the plurality of I/O terminals of the programmable HVAC controller assigned to a particular I/O function. The method may also include the step of downloading the configuration profile to the programmable HVAC controller. The method may further include generating a terminal diagram that is suitable to label at least some of the plurality of I/O terminals of the programmable HVAC controller with the assigned particular I/O functions that are defined by the configuration profile, and the terminal diagram may be output in a digital document format. The method may further include printing a label suitable for adhering to the programmable HVAC controller such that at least some of the plurality of I/O terminals of the programmable HVAC controller have an adjacent label marking that labels the corresponding I/O terminal with the assigned particular I/O function. Once printed, the label may be adhered to the programmable HVAC controller housing. Any or all steps of this method may be performed in the field, if desired.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which:

FIG. 4 is a flowchart showing an exemplary method for configuring a programmable HVAC controller having a plurality of I/O terminals.

DESCRIPTION

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized. Moreover, while the various devices, algorithms, and methods herein are described for use in HVAC systems, it should be understood that the present disclosure can be employed in relation to other types of systems. Examples of other types of systems can include, but are not limited to, security systems, automation systems, sprinkler systems, and lighting systems.

Figure 1:
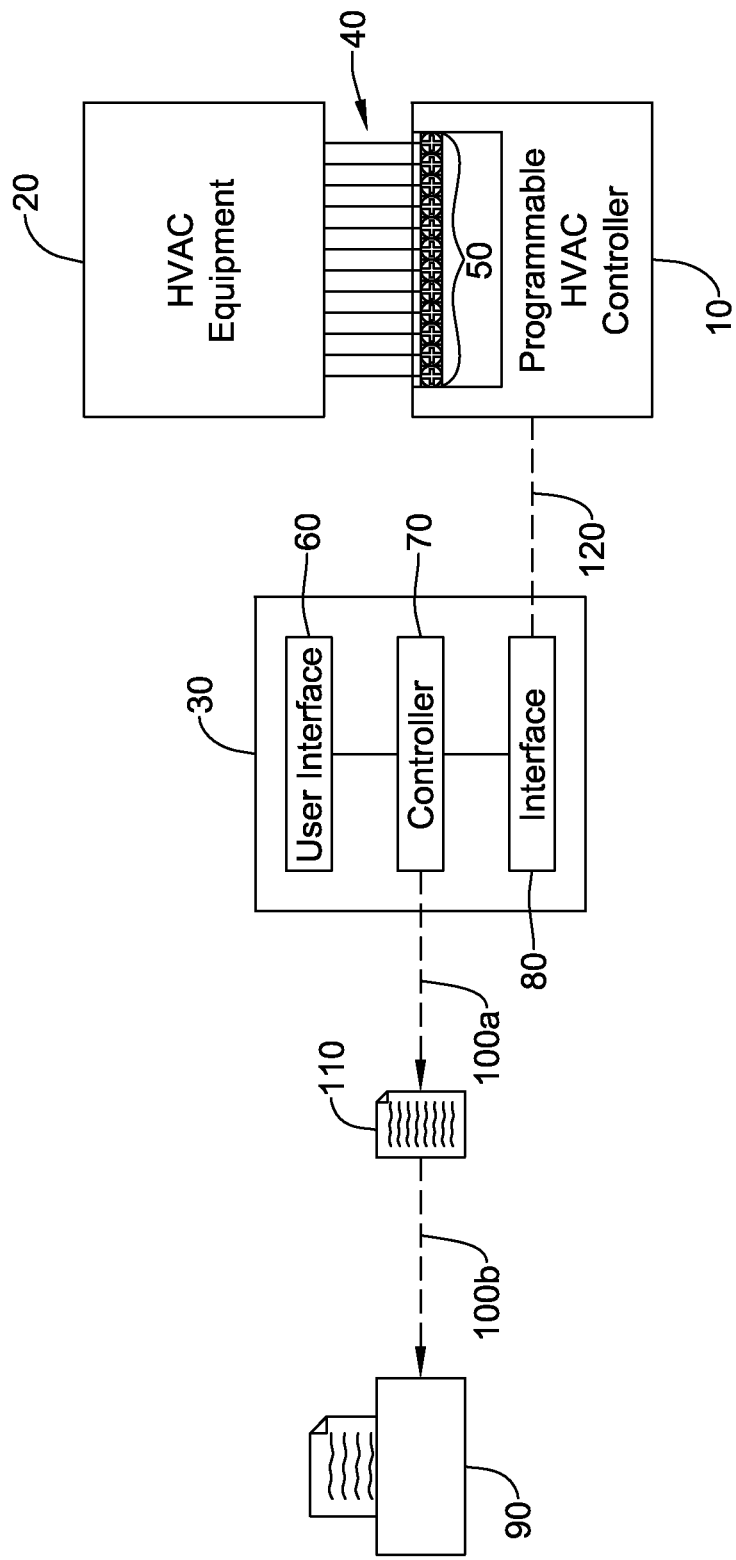
FIG. 1 is a schematic diagram showing connections and relationships between a programmable HVAC controller, HVAC equipment, and a configuration tool in an illustrative embodiment of the present disclosure.

FIG. 1 is a schematic diagram showing connections and relationships between a programmable HVAC controller 10, HVAC equipment 20, and a configuration tool 30 in an illustrative embodiment of the present disclosure.

Programmable HVAC controller 10 may be connected to HVAC equipment 20 in the field via a plurality of control lines 40 connected to input/output (I/O) terminals 50 of the programmable HVAC controller 10. In the illustrative embodiment, programmable HVAC controller 10 may be configurable to function as a new or replacement application-specific controller, such as a ventilation controller, electronic thermostat controller, heat pump controller, and/or any other type of HVAC controller, as desired. In some cases, programmable HVAC controller 10 may be structured to be configurable as any one of a wide variety of application-specific controllers. In other cases, programmable HVAC controller 10 may be structured to be configurable to function as any one of a more limited set of application-specific controllers. HVAC equipment 20 may be any suitable HVAC equipment that is controllable in full or in part by programmable HVAC controller 10. In some embodiments, programmable HVAC controller 10 may be a unitary controller configured to control unitary HVAC equipment. Programmable HVAC controller 10 may include any suitable components needed to function as a configurable HVAC controller. Such components may include, but are not necessarily limited to, microprocessors, volatile and/or non-volatile memory, analog and/or digital input and output terminals, onboard sensors, status indicators, power supply interfaces, communication interfaces, user interface elements, and so on.

During setup, various I/O terminals 50 of programmable HVAC controller 10 can be configured to match the hardware and software configurations for the particular type of HVAC equipment 20 to be controlled by the programmable HVAC controller 10. At least some I/O terminals 50 of programmable HVAC controller 10 may not have fixed functionality, but instead may be assignable (configurable) to have particular I/O functions, depending on the particular task, control function and/or HVAC equipment 20 that the programmable HVAC controller 10 is to control. In some cases, all of the I/O terminals of programmable HVAC controller 10 are assignable. In other cases, only some of the I/O terminals 50 of programmable HVAC controller 10 are assignable, and others have fixed functions (i.e., are non-assignable).

Each assignable/configurable I/O terminal of programmable HVAC controller 10 may be characterized by a number of attributes. These attributes generally may depend on the physical structure (hardware) of the programmable HVAC controller 10. A terminal may be configurable solely as in input terminal, solely as an output terminal, or it may be configurable as an input terminal, an output terminal and/or a bi-directional terminal. Whether configurable as an input, an output, or bi-directional terminal, a terminal may be capable of receiving/transmitting solely analog signals, solely digital signals, or it may be capable of receiving/transmitting either analog or digital signals. An I/O terminal capable of handing both analog and digital signals may be referred to as a universal I/O terminal.

In some cases, programmable HVAC controller 10 may have a plurality of assignable I/O terminals subdivided into subsets of terminals having any suitable combination of attributes. For example, one programmable HVAC controller may have a first subset of assignable I/O terminals that are analog inputs, a second subset of assignable I/O terminals that are universal inputs, and a third subset of assignable I/O terminals that are universal outputs. Another programmable HVAC controller may have a first subset of assignable I/O terminals that are universal inputs and a second subset of assignable I/O terminals that are digital outputs. Still another programmable HVAC controller may have assignable I/O terminals that are all universal inputs or outputs. In general, any possible combination of subsets of assignable I/O terminals may be contemplated.

Programmable HVAC controller 10 may be configured for a particular application in conjunction with configuration tool 30 of FIG. 1. In some instances, configuration tool 30 may include a user interface 60 and a controller 70 in communication with the user interface. Controller 70 may be programmed to accept user input from a user via user interface 60, and based on the accepted input from the user, generate a corresponding configuration profile. Configuration tool 30 may include an interface 80 that is in communication with controller 70. When the interface 80 of the configuration tool 30 is connected to a corresponding interface (not shown) of the programmable HVAC controller 10, the controller 70 may download the configuration profile to the programmable HVAC controller via the interface 80. The configuration profile, once loaded into the programmable HVAC controller 10, may cause the programmable HVAC controller 10 to assume a particular controller configuration. In a particular controller configuration, each of at least some of the plurality of assignable I/O terminals 50 of the programmable HVAC controller 10 may be assigned to a particular I/O function.

Configuration tool 30 may be implemented as any appropriate device. For example, configuration tool 30 may include any suitable type of computer, such as a desktop computer or a laptop/notebook computer. Configuration tool 30 may include any suitable kind of portable device, including portable handheld devices, such as cellular/mobile/wireless phones, tablet/pad computing devices, personal digital assistants (PDAs), and/or the like. Configuration tool 30 may include and/or access any suitable information resources, such as descriptions of HVAC equipment, HVAC controllers, application-specific controllers, programmable HVAC controllers such as programmable HVAC controller 10; information about a building having HVAC equipment for which a controller is being configured by the configuration tool, climate information, utility information, and/or any other information that may be of use in configuring programmable HVAC controllers and the HVAC systems of which they are a part. Any such information resources may be stored locally with the configuration tool 30, and/or they may be accessed over an information network, such as the internet, cellular network, or any other suitable network. Configuration tools of the present disclosure may be used to perform methods of the present disclosure in the field, for example, at an installation job site, rather than at a manufacturing facility, if desired.

User input to configuration tool 30 via user interface 60 may take any suitable form. As non-limiting examples, a user may make alphanumeric entries, may respond to interview-style queries from the user interface 60, may manipulate a graphical-programming environment hosted by the user interface, receive user input from another device via an IR link, RF link, a wired link, a wireless link, or the like, as desired. In one example, a user may enter information relating to a known HVAC controller model, and in response, the controller 70 of the configuration tool 30 may generate a corresponding configuration profile that will cause the programmable HVAC controller 10 to emulate the known HVAC controller model. In another example, a user may enter information relating to a model of programmable HVAC controller 10 as well as information about the HVAC equipment 20, and in response, the controller 70 of the configuration tool 30 may generate a corresponding configuration profile for a programmable HVAC controller 10 that, when loaded into the programmable HVAC controller 10, causes the programmable HVAC controller 10 to properly control the HVAC equipment 20. In yet another example, a user may enter information relating to characteristics of a particular HVAC system to be controlled by the programmable HVAC controller 10. Based on the accepted input from the user, the controller 70 may generate a corresponding configuration profile that, once loaded into the programmable HVAC controller 10, causes the programmable HVAC controller 10 to assume a particular controller configuration that is suitable for controlling the particular HVAC system or part of the system. In these examples, each of at least some of the plurality of configurable I/O terminals of the programmable HVAC controller 10 may be assigned to a particular I/O function. These assigned I/O functions may be tailored to controlling specific HVAC equipment or a particular HVAC system related to the user input.

Because of the configurable/customizable nature of the programmable HVAC controllers of the present disclosure, at least some of the I/O terminals, such as terminals 50 of programmable HVAC controller 10, may correspond to I/O functions not assigned or known at the time of manufacture of the programmable HVAC controller 10, or at the time of delivery of the programmable HVAC controller 10 to the installer, who may be the person configuring the programmable HVAC controller 10 for end use. Accordingly, programmable HVAC controllers of the present disclosure may be provided with at least some, and in some cases, all assignable/configurable I/O terminals not having labels indicating their functionality. Such labels may be referred to as terminal labels or terminal label markings.

In accordance with the configurability of programmable HVAC controllers of the present disclosure, the controller 70 of configuration tool 30 may be programmed to generate a terminal diagram that labels at least some of the plurality of assignable I/O terminals 50 of the programmable HVAC controller 10 with the assigned particular I/O functions that are defined by the configuration profile associated with the programmable HVAC controller 10. Other information may be provided on the generated terminal diagram as well, such as labels for non-assignable (i.e., fixed) I/O terminals. The terminal diagram generated by the configuration tool 30 may be provided in any suitable manner. The terminal diagram may be shown on a display of the user interface 60 of the configuration tool 30. The controller 70 may be programmed to output the terminal diagram in a format that can be printed on a label, with the label suitable for adhering to the programmable HVAC controller 10 such that at least some of the plurality of assignable I/O terminals of the programmable HVAC controller have an adjacent label marking that labels the corresponding assignable I/O terminal with its assigned particular I/O function. Such a printed label may be referred to as a terminal overlay or a terminal overlay label. While the term "label" may be used with multiple meanings in the present disclosure, its meaning in any particular instance should be clear to one of ordinary skill in the art. For example, label may be used to refer to a terminal overlay label, which may include multiple label markings used to label assignable I/O terminals of a programmable HVAC controller. A printed label may be an adhesive label (i.e., "sticker") having an adhesive on one side for attaching the label to the programmable HVAC controller 10. In some cases, the labels may be pre-defined to fit within a predefined label area on the housing of the programmable HVAC controller 10, as further described below.

In some instances, the configuration tool 30 may be connected to a printer 90 for printing labels. This connection may be made in any suitable way, and is indicated generically by dashed arrows 100a and 100b. Printer 90 may be any suitable printer, such as a laser printer, inkjet printer, thermal printer, or any other printer using any suitable printing technology capable of printing labels. Printer 90 may be a general purpose printer, or a printer specifically configured for printing labels. Printer 90 may be a portable printer transportable to a job site. In some instances, it may be physically integrated with configuration tool 30. For example, a handheld device or notebook computer may include a user interface 60, controller 70, interface 80, printer 90, and any other appropriate elements in a single, easily transportable unit. In other cases, printer 90 may be physically distinct and separate from the configuration tool 30.

Connection 100a/b between configuration tool 30 and printer 90 may be made in any suitable manner. A physical connection using any suitable communication protocol over any suitable hardware implementation may be used, such as USB, Ethernet, Firewire, Thunderbolt, serial or parallel printer cables, and so on. Wireless connections are contemplated as well, using any suitable communication protocol such as WiFi, ZigBee, Bluetooth, or any other suitable technology using RF, optical, acoustical communication, etc. Connection 100a/b between controller 70 and printer 90 may be implemented through interface 80 or through any other wired or wireless path, as desired.

In some illustrative embodiments, controller 70 of the configuration tool 30 may be programmed to output the terminal diagram in a digital document format 110. Any suitable digital document format may be used, such as Adobe™ PDF format, Microsoft Word™ format, TeX, HTML, XML, TIFF, JPG, GIF, and so on. Any suitable description language may be used, such as PCL, Postscript, etc. Controller 70 may output a terminal diagram in digital document format 110 to a printer 90 for immediate printing via connection 100a/b, or the digital document format may be saved to a file for possible printing or reference at a later time. A file containing a digital document format 110 may be maintained in any suitable volatile or non-volatile memory or storage device, such as such as in a RAM, on a flash memory drive, on a hard drive, in a PDA, etc. In FIG. 1, connection 100a may represent output of controller 70 of a digital document format 110 to a storage medium, and connection 100b may represent subsequent conveyance of the stored digital document to a printer. It must be understood, however, that the controller 70 may directly output the label to a printer 90. In such cases, the controller 70 may include an appropriate printer driver, as desired.

Interface 80 through which controller 70 may download a configuration profile to a programmable HVAC controller 10 may take any suitable form. A configuration profile may be implemented in a digital format, and the download may include transferring of digital information from controller 70 of the configuration tool 30 to a memory in programmable HVAC controller 10. A physical connection using any suitable communication protocol over any suitable hardware implementation may be used, such as USB, Ethernet, Thunderbolt, serial or parallel printer cables, and so on. Wireless connections are contemplated as well, using any suitable communication protocol such as WiFi, ZigBee, Bluetooth, or any other suitable technology using RF, optical, acoustical communication, etc. Interface 80 may be a custom interface not employing any of the standards or protocols mentioned herein. Connection between configuration tool 30 and programmable HVAC controller 10 is symbolically represented in FIG. 1 by link 120. Download of a configuration profile to a programmable HVAC controller 10 may be, once initiated, a process requiring no user intervention. In some cases, user intervention may be required, such as adjusting physical or virtual switches on the programmable HVAC controller 10 and/or configuration tool 30. In some cases, download of a configuration profile to a programmable HVAC controller 10 may be a manual procedure, with a user, for example, entering configuration information into programmable HVAC controller 10 via adjustment of onboard switches such as DIP switches, buttons, or any other suitable user interface elements. In some cases, download of a configuration profile to a programmable HVAC controller 10 may combine manual and automated steps.

Figure 2A:
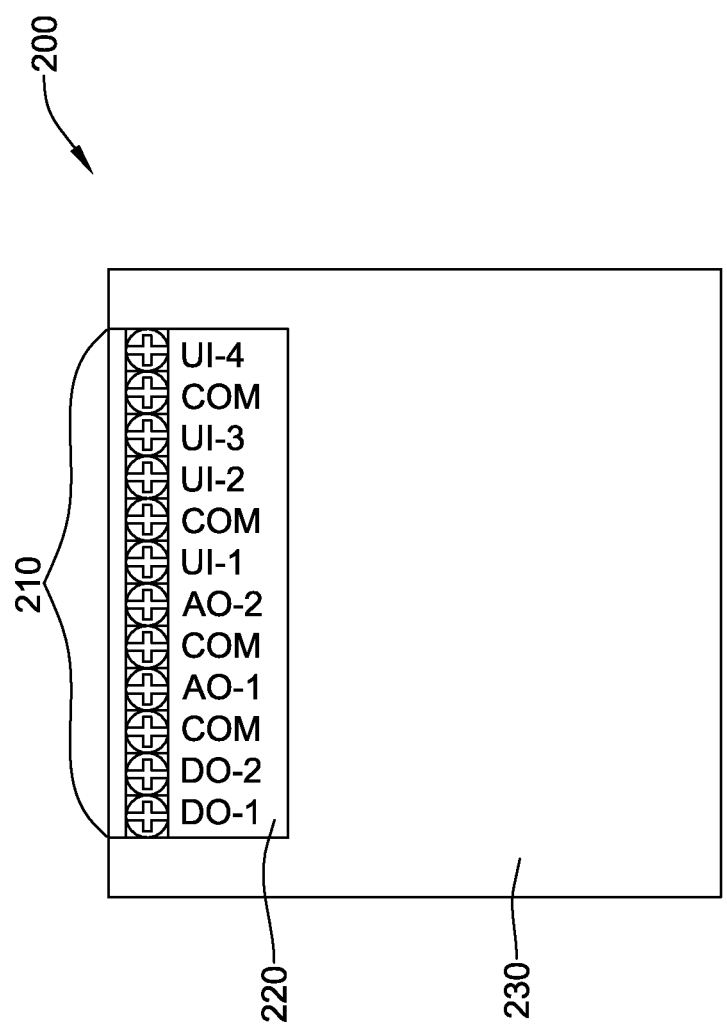
FIG. 2a is a schematic illustration of an exemplary programmable HVAC controller having I/O terminals and a neighboring label area.

FIG. 2a is a schematic illustration of an exemplary programmable HVAC controller 200 having I/O terminals 210, at least some of which may be assignable. HVAC controller 200 may have other I/O terminals not visible in FIG. 2a or 2b. In FIG. 2a, a label area 220 located on an enclosure or housing 230 of programmable HVAC controller 200 includes label markings for all of the I/O terminals 210. Label markings illustrated in FIG. 2a may represent default label markings printed directly on enclosure 230. In some illustrative embodiments, not all I/O terminals 210 of programmable HVAC controller 200 may be labeled by label markings in label area 220. In some illustrative embodiments, label area 220 located on an enclosure or housing 230 of programmable HVAC controller 200 is blank, containing no labels marking functions of the I/O terminals 210. Labeled terminals may be assignable or non-assignable I/O terminals. Default label markings may also or alternatively be provided on a terminal overlay or label at the time of manufacture or otherwise prior to delivery of programmable HVAC controller 200 to an installer.

Figure 2B:
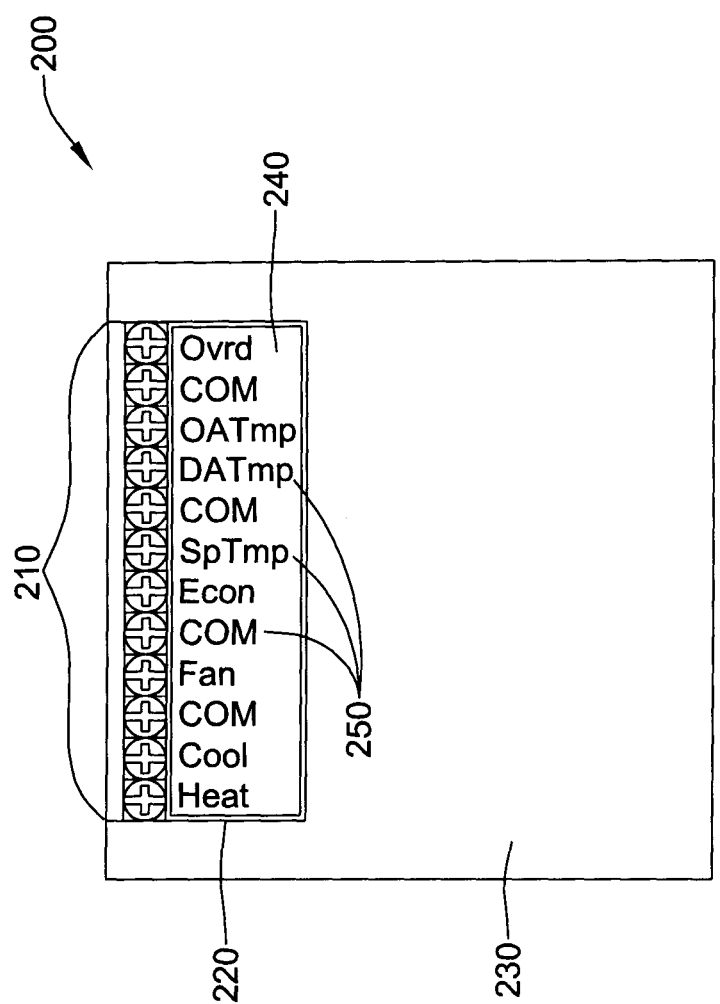
FIG. 2b is a schematic illustration of the programmable HVAC controller of FIG. 2a showing a terminal overlay label located in the label area.

FIG. 2b is a schematic illustration of the programmable HVAC controller 200 of FIG. 2a showing a terminal overlay label 240 located in label area 220. Label 240 may include label markings 250 that label at least some I/O terminals 210 of programmable HVAC controller 200 in accordance with a downloaded configuration. Label markings of label 240 may label some or all assignable I/O terminals, non-assignable terminals, or both, or any combination of I/O terminals. Label 240 may obscure underlying terminal label markings, for example, markings printed on enclosure 230 or on an applied label disposed between the enclosure and outer-most label 240. Terminal overlay label 240 may originate from a terminal diagram generated by configuration tool 30 of the present disclosure. Label 240 as shown in FIG. 2b may literally represent a physical label adhered or otherwise attached, or ready to be attached, to programmable HVAC controller 200.

In some cases, the labels may be pre-defined to fit inside the label area 220 on the enclosure, if desired. Alternately, FIG. 2b may be interpreted as representing a terminal overlay diagram generated by a configuration tool of the present disclosure. Such a terminal overlay diagram may be stored in a digital file format, displayed on a PDA or electronic tablet, etc., that may serve as a reference for an installer during installation, or be disposed in any other appropriate manner.

Figure 3:
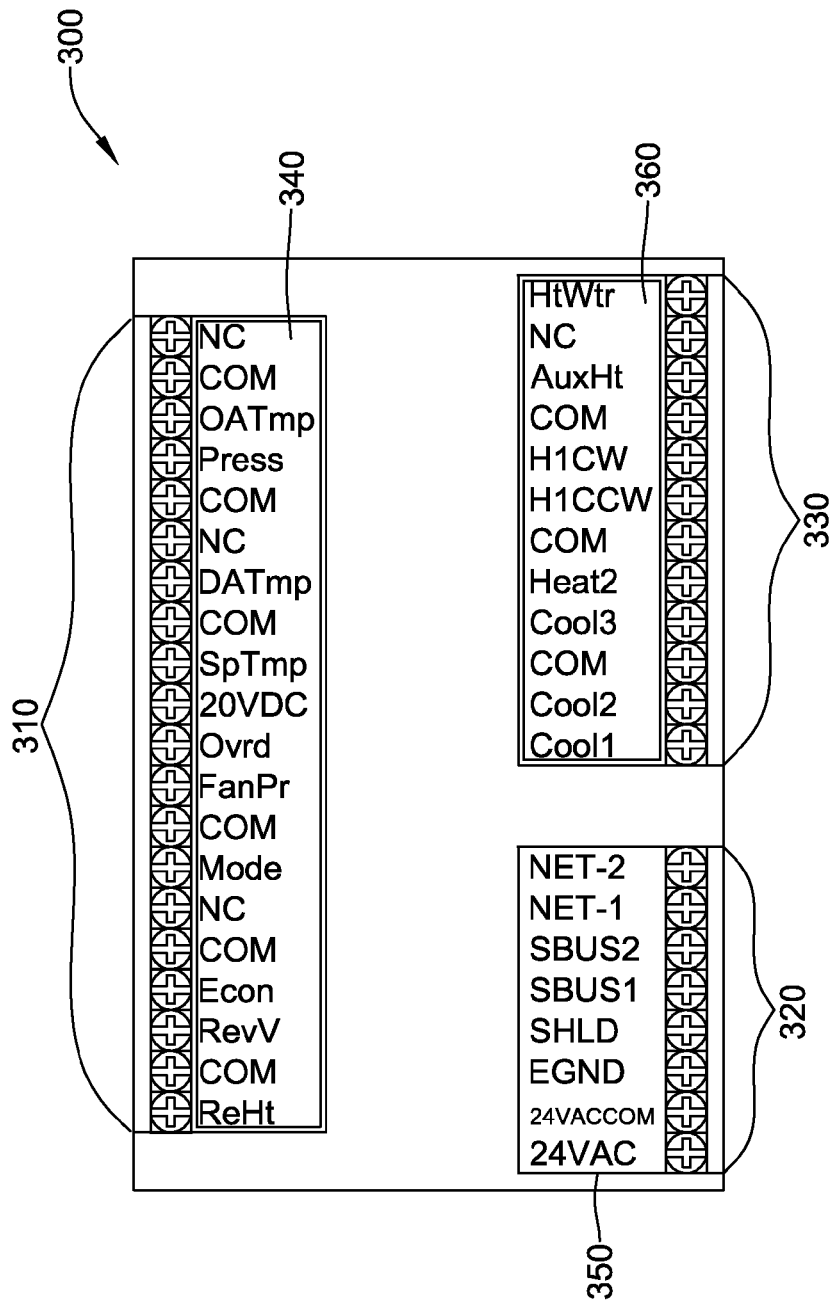
FIG. 3 is a schematic illustration of an exemplary programmable HVAC controller having multiple banks of I/O terminals, with each bank of I/O terminals having a neighboring label area.

While programmable HVAC controller 200 is illustrated in FIGS. 2a and 2b having a single (visible) bank or set of I/O terminals 210, other configurations are contemplated. FIG. 3 is a schematic illustration of an exemplary programmable HVAC controller 300 having multiple banks of I/O terminals 310, 320, and 330. Any suitable configuration of assignable I/O and possibly non-assignable I/O terminals are contemplated. As illustrated for the exemplary programmable HVAC controller 300 of FIG. 3, I/O terminals 320 may be non-assignable, dedicated to functions defined by the HVAC controller architecture. Label areas 340, 350, and 360 may be disposed adjacent banks of I/O terminals 310, 320, and 330, respectively. A terminal diagram generated by a configuration tool 30 of the present disclosure may include terminal overlay labels for each of label areas 340, 350, and 360, or any subset of the label areas. While label areas in FIGS. 2a, 2b, and 3 are depicted on a front side of programmable HVAC controllers, this should not be considered limiting. Terminal diagrams of the present disclosure may describe labeling of I/O terminals wherever they may be disposed in or on a programmable HVAC controller. Label areas may be located along sides or on a back surface of a controller. In some cases, a programmable HVAC controller may include a main unit that is configured to be detachable from a base or part that attaches to a wall or other structure, the base attached to the wall providing convenient attachment points to I/O terminals of the controller. One or more labels may be attached to the base to mark I/O terminals. When the main unit is re-attached to the base, the I/O terminals and their labels may be contained inside the programmable HVAC controller and hidden from view. Any compatible configurations of programmable HVAC controller are contemplated for use with the devices and methods of the present disclosure.

FIG. 4 is a flowchart showing an exemplary method 400 for configuring a programmable HVAC controller having a plurality of I/O terminals. The programmable HVAC controller may be, for example, programmable HVAC controller 10 of FIG. 1 or any other suitable programmable HVAC (or other) controller. It is contemplated that method 400 may be practiced at least in part using other elements of FIG. 1, such as configuration tool 30.

At 410, the method may include accepting user input from a user via a user interface. Based on the accepted input from the user, at 420, the method may include generating a corresponding configuration profile. The configuration profile, if loaded into the programmable HVAC controller, may cause the programmable HVAC controller to assume a particular controller configuration, with each of at least some of the plurality of I/O terminals of the programmable HVAC controller assigned to a particular I/O function. The configuration profile having been generated at 420, at 430 the method may include downloading the configuration profile to the programmable HVAC controller. It should be noted, however, that it is not necessary to download the configuration profile to the programmable HVAC controller immediately after its generation and before subsequent steps—for example, the configuration profile may be stored in a volatile or non-volatile memory, and may be downloaded to the programmable HVAC controller at a later time, possibly after other steps of method 400 have been executed. At 440, method 400 may include generating a terminal diagram that is suitable to label at least some of the plurality of I/O terminals of the programmable HVAC controller with the assigned particular I/O functions that are defined by the configuration profile. At 450, the generated terminal diagram may optionally be output in a digital document format, as described further elsewhere herein. At 460, a label may be printed based on the terminal diagram generated in step 440. The label may be suitable for adhering to the programmable HVAC controller such that at least some of the plurality of I/O terminals of the programmable HVAC controller have an adjacent label marking that labels the corresponding I/O terminal with the assigned particular I/O function. The method may further include the step 470 of adhering the label to the programmable HVAC controller such that at least some of the plurality of I/O terminals of the programmable HVAC controller have an adjacent label marking that labels the corresponding I/O terminal with the assigned particular I/O function. It is noted that any or all of the steps the method of FIG. 4 may be performed in the field, using, for example, tools and elements described in the present disclosure.

The disclosure should not be considered limited to the particular examples described above. Various modifications, equivalent processes, as well as numerous structures to which the disclosure can be applicable will be readily apparent to those of skill in the art upon review of the instant specification. Other steps may be provided, or steps may be eliminated, from the described methods, and other components may be added to, or removed from, the described devices.

What is claimed is:

1. A system having a configuration tool for configuring a programmable HVAC controller having a plurality of assignable I/O terminals, the configuration tool comprising:
   a user interface;
   a controller including a processor, the controller in communication with the user interface, wherein the controller is programmed to accept user input from a user via the user interface, and based on the accepted input from the user, generate a corresponding configuration profile, wherein the configuration profile, once loaded into the programmable HVAC controller, causes the programmable HVAC controller to assume a particular controller configuration, with each of at least some of the plurality of assignable I/O terminals of the programmable HVAC controller assigned to a particular I/O function;
   an interface in communication with the controller, wherein once the configuration tool is connected to the programmable HVAC controller, the controller can download the configuration profile to the programmable HVAC controller via the interface; and
   the controller further programmed to generate a terminal diagram that labels at least some of the plurality of assignable I/O terminals of the programmable HVAC controller with the assigned particular I/O functions that are defined by the configuration profile.

2. The configuration tool of claim 1, wherein the controller is programmed to output the terminal diagram in a format that can be printed on a label, with the label suitable for adhering to the programmable HVAC controller such that at least some of the plurality of assignable I/O terminals of the programmable HVAC controller have an adjacent label marking that labels the corresponding assignable I/O terminal with the assigned particular I/O function.

3. The configuration tool of claim 2, wherein the controller is programmed to output the terminal diagram in a digital document format.

4. The configuration tool of claim 3, wherein the controller is programmed to output the terminal diagram in an Adobe™ PDF format.

5. The configuration tool of claim 3, wherein the controller is programmed to output the terminal diagram in a Microsoft Word™ format.

6. The configuration tool of claim 1, wherein the configuration tool includes a desktop computer.

7. The configuration tool of claim 1, wherein the configuration tool includes a notebook computer.

8. The configuration tool of claim 1, wherein the configuration tool is implemented as part of a portable handheld device.

9. The configuration tool of claim 8, wherein the portable handheld device is a cell phone.

10. The configuration tool of claim 8, wherein the portable handheld device is personal digital assistant.

11. A system having a configuration tool for configuring a programmable HVAC controller having a plurality of configurable I/O terminals, the configuration tool comprising:
    a user interface;
    a controller including a processor, the controller in communication with the user interface, wherein the controller is programmed to accept user input from a user via the user interface, wherein the input relates to characteristics of a particular HVAC system to be controlled by the programmable HVAC controller, and based on the accepted input from the user, generate a corresponding configuration profile, wherein the configuration profile, once loaded into the programmable HVAC controller, causes the programmable HVAC controller to assume a particular controller configuration that is suitable for controlling the particular HVAC system, with each of at least some of the plurality of configurable I/O terminals of the programmable HVAC controller assigned to a particular I/O function that is tailored to controlling the particular HVAC system;
    an interface in communication with the controller, wherein once the configuration tool is connected to the programmable HVAC controller, the controller can download the configuration profile to the programmable HVAC controller via the interface; and
    the controller further programmed to generate a terminal diagram that labels at least some of the plurality of configurable I/O terminals of the programmable HVAC controller with the assigned particular I/O functions that are defined by the configuration profile.

12. The configuration tool of claim 11, wherein the controller is programmed to output the terminal diagram in a format that can be printed on a label, with the label suitable for adhering to the programmable HVAC controller such that at least some of the plurality of terminals of the programmable HVAC controller have an adjacent label marking that labels the corresponding configurable I/O terminal with the assigned I/O function.

13. The configuration tool of claim 12, wherein the controller is programmed to output the terminal diagram in a digital document format.

14. The configuration tool of claim 13, wherein the controller is programmed to output the terminal diagram in an Adobe™ PDF format.

15. The configuration tool of claim 13, wherein the controller is programmed to output the terminal diagram in a Microsoft Word™ format.

16. A method for configuring a programmable HVAC controller having a plurality of I/O terminals, comprising:

accepting user input from a user via a user interface, and based on the accepted input from the user, generating a corresponding configuration profile, wherein the configuration profile, if loaded into the programmable HVAC controller, will cause the programmable HVAC controller to assume a particular controller configuration, with each of at least some of the plurality of I/O terminals of the programmable HVAC controller assigned to a particular I/O function;

downloading the configuration profile to the programmable HVAC controller; and generating a terminal diagram that is suitable to label at least some of the plurality of I/O terminals of the programmable HVAC controller with the assigned particular I/O functions that are defined by the configuration profile.

17. The method of claim 16, further comprising outputting the terminal diagram in a digital document format.

18. The method of claim 16, further comprising printing a label suitable for adhering to the programmable HVAC controller such that at least some of the plurality of I/O terminals of the programmable HVAC controller have an adjacent label marking that labels the corresponding I/O terminal with the assigned particular I/O function.

19. The method of claim 18, further comprising adhering the label to the programmable HVAC controller such that at least some of the plurality of I/O terminals of the programmable HVAC controller have an adjacent label marking that labels the corresponding I/O terminal with the assigned particular I/O function.

20. The method of claim 16, where in the steps of accepting user input, downloading the configuration profile, and generating the terminal diagram are performed in the field.

* * * * *